(12) United States Patent
Bae et al.

(10) Patent No.: US 12,600,027 B2
(45) Date of Patent: Apr. 14, 2026

(54) APPARATUS FOR ASSISTING MUSCULAR STRENGTH

(71) Applicants: Hyundai Motor Company, Seoul (KR); Kia Corporation, Seoul (KR)

(72) Inventors: Ki Hyeon Bae, Hwaseong (KR); Sang In Park, Suwon (KR); Ju Young Yoon, Suwon (KR); Kyu Jung Kim, Seoul (KR); Min Woong Jeung, Seoul (KR); Hyo Joong Kim, Suwon (KR); Seong Taek Hwang, Suwon (KR); Ho Jun Kim, Gunpo (KR); Hyun Seop Lim, Anyang (KR); Beom Su Kim, Yongin (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 912 days.

(21) Appl. No.: 17/889,247

(22) Filed: Aug. 16, 2022

(65) Prior Publication Data

US 2023/0201650 A1     Jun. 29, 2023

(30) Foreign Application Priority Data

Dec. 27, 2021     (KR) ........................ 10-2021-0188956

(51) Int. Cl.
B25J 9/00         (2006.01)
(52) U.S. Cl.
CPC ..... B25J 9/0006 (2013.01); *A61H 2201/0157* (2013.01); *A61H 2201/1621* (2013.01); *A61H 2201/164* (2013.01); *A61H 2201/1652* (2013.01)
(58) Field of Classification Search
CPC ...... B25J 9/0006; B25J 19/0016; B25J 9/104; B25J 19/106; A61H 1/0244; A61H 3/00;
(Continued)

(56) References Cited

U.S. PATENT DOCUMENTS

| | | | |
|---|---|---|---|
| 7,744,552 B1 * | 6/2010 | Babcock | ................. A61H 3/00 602/19 |
| 10,328,300 B2 | 6/2019 | Ko | |

(Continued)

FOREIGN PATENT DOCUMENTS

| | | | | |
|---|---|---|---|---|
| CN | 110757437 A | * | 2/2020 | ............ B25J 9/0006 |
| CN | 212352010 U | | 1/2021 | |

(Continued)

OTHER PUBLICATIONS

CN 110757437 A machine translation accessed Aug. 9, 2025 (Year: 2025).*

*Primary Examiner* — Brandy S Lee
*Assistant Examiner* — Kelsey Rhee
(74) *Attorney, Agent, or Firm* — Fox Rothschild LLP

(57)         ABSTRACT

Provided is an apparatus for assisting muscular strength, including an upper frame; a lower frame configured to be rotatable relative to the upper frame; and a force generating unit configured to provide the lower frame with a force applied in a second rotational direction D2 opposite to a first rotational direction D1 when the lower frame rotates in the first rotational direction D1 relative to the upper frame. The force generating unit includes a frame member configured to define a body of the force generating unit; a first spring accommodated in the frame member; a pressing part disposed at one side of the first spring and configured to press the first spring; and a link part disposed at the other side of the first spring and configured to press the first spring and move in conjunction with a relative rotational motion between the upper frame and the lower frame.

16 Claims, 13 Drawing Sheets

(58) Field of Classification Search
  CPC ... A61F 5/01; A63B 21/4001; A63B 21/4009;
      A63B 21/4011; A63B 21/4025; A63B
      21/65; A63B 21/012; A63B 21/02; A63B
      21/04; A63B 21/0407–0435
  See application file for complete search history.

(56)             References Cited

U.S. PATENT DOCUMENTS

| | | | |
|---|---|---|---|
| 2013/0184626 A1 | 7/2013 | Kazerooni et al. | |
| 2014/0378882 A1 | 12/2014 | Kazerooni et al. | |
| 2016/0250062 A1 | 9/2016 | Radaelli et al. | |
| 2017/0100626 A1 | 4/2017 | Ko | |
| 2018/0049905 A1 | 2/2018 | Holscher et al. | |
| 2018/0055712 A1* | 3/2018 | Gayral | A61H 1/0266 |
| 2019/0358074 A1 | 11/2019 | Zelik et al. | |
| 2020/0171648 A1* | 6/2020 | Tung | A61H 1/0244 |
| 2021/0275381 A1 | 9/2021 | Kim et al. | |
| 2022/0331134 A1* | 10/2022 | Tsai | B25J 9/0006 |

FOREIGN PATENT DOCUMENTS

| | | | | |
|---|---|---|---|---|
| JP | 2020-066529 A | 4/2020 | | |
| KR | 10-2017-0043116 A | 4/2017 | | |
| KR | 10-2045677 B1 | 11/2019 | | |
| KR | 10-2289850 B1 | 8/2021 | | |
| KR | 10-2021-0113504 A | 9/2021 | | |
| WO | WO-2023281401 A1 * | 1/2023 | | B25J 9/0006 |

* cited by examiner (FIG.8B)

APPARATUS FOR ASSISTING MUSCULAR STRENGTH

CROSS-REFERENCE TO RELATED APPLICATION

This application is based on and claims the benefit of Korean Patent Application No. 10-2021-0188956 filed in the Korean Intellectual Property Office on Dec. 27, 2021, the entire contents of which are incorporated herein by reference.

TECHNICAL FIELD

Embodiments of the present disclosure relate to an apparatus for assisting muscular strength, and more particularly, to an apparatus for assisting muscular strength, which is capable of assisting strength of a user's waist muscles.

DESCRIPTION OF RELATED ART

An apparatus for assisting strength of waist muscles, which is capable of assisting strength of a user's waist muscles while the user works, generates torque by applying elasticity to body portions in the vicinity of rotatable joints such as hip joints, thereby reducing a load applied to the user's waist during the work process.

The apparatuses for assisting strength of waist muscles are broadly classified into an active apparatus that provides a force for assisting muscular strength by using a power source such as a motor, and a passive apparatus that provides a force for assisting muscular strength according to a user's posture without a separate power source. The passive apparatus for assisting strength of waist muscles in the related art includes torque generating devices mounted at two opposite sides of the hip joints and configured to generate torque for assisting muscular strength, and structures mounted on the user's upper and lower bodies. In this case, positional relationships between internal components of the torque generating devices are changed by a relative rotational motion between the user's upper and lower bodies, and thus the torque for assisting muscular strength is generated.

The apparatus for assisting strength of waist muscles needs to have a structure capable of providing various types of torque profiles according to which posture the user takes while working in order to provide the user with optimized muscular strength assistance.

In addition, a torsional load may be generated during an operating process of the apparatus for assisting muscular strength when a point of application of force applied by the user's upper body, a point of application of force applied by the user's lower body, and the torque generating device are not present on the same plane. Accordingly, there is a need to minimize the torsional load in order to improve durability of the apparatus for assisting muscular strength and prevent the user from having a feeling of irritation.

SUMMARY

Embodiment of the present disclosure have been made in an effort to provide an apparatus for assisting muscular strength, which has a structure capable of providing various types of torque profiles.

Embodiments of the present disclosure have also been made in an effort to provide an apparatus for assisting muscular strength, which is capable of improving wearing comfort and durability by minimizing a torsional load generated during an operating process.

An exemplary embodiment of the present disclosure provides an apparatus for assisting muscular strength, the apparatus including: an upper frame configured to be fixed to a user's upper body; a lower frame disposed below the upper frame and configured to be fixed to the user's lower body and rotatable relative to the upper frame; and a force generating unit coupled to one side of the upper frame and configured to provide the lower frame with a force applied in a second rotational direction D2 opposite to a first rotational direction D1 when the lower frame rotates in the first rotational direction D1 relative to the upper frame, in which the force generating unit includes: a frame member configured to define a body of the force generating unit; a first spring accommodated in the frame member; a pressing part disposed at one side of the first spring and configured to press the first spring; and a link part disposed at the other side of the first spring and configured to press the first spring and move in conjunction with a relative rotational motion between the upper frame and the lower frame.

The pressing part may include a block member coupled to be rotatable about a first rotary shaft A1 fixed to the frame member, and the block member may be shaped such that a distance between the first rotary shaft A1 and a region in which the pressing part is in close contact with the first spring varies depending on a rotation angle of the block member.

The pressing part may further include a support member disposed at one side of the block member, provided separately from the block member, and configured to come into contact with the first spring, and a distance between the support member and the first rotary shaft A1 may vary depending on the rotation angle of the block member.

A geometric center of the block member may be spaced apart from a rotation center of the first rotary shaft A1.

The block member and the support member may be disposed above the first spring, and the link part may be disposed below the first spring.

The force generating unit may further include a second spring disposed between the pressing part and the link part and having one end facing the pressing part and the other end facing the link part, and an elastic modulus of the first spring may be larger than an elastic modulus of the second spring.

The second spring may be inserted into the first spring.

The link part may include: a first link having one side rotatably coupled to a second rotary shaft A2 fixed to the frame member and the other side connected to the lower frame; and a second link having one side rotatably coupled to the first link through a third rotary shaft A3 and the other side provided to be movable in an upward/downward direction, and the first and second springs may be contracted or expanded as the other side of the second link moves in the upward/downward direction.

The frame member may have a groove region extending in the upward/downward direction, and the other side of the second link may be disposed in the frame member, inserted into the groove region, and rotatably coupled to a fourth rotary shaft A4 provided to be movable in the upward/downward direction.

The upper frame may include: a right extension member extending in an upward/downward direction and configured to come into contact with a right region of the user's body; a left extension member extending in the upward/downward direction and configured to come into contact with a left region of the user's body; and a chest pad member coupled to the right and left extension members and configured to come into contact with the user's chest region, the chest pad member may be coupled to be movable in the upward/downward direction relative to the right extension member and to be rotatable about an axis extending in a direction in which the right extension member extends, and the chest pad member may be coupled to be movable in the upward/downward direction relative to the left extension member and to be rotatable about an axis extending in a direction in which the left extension member extends.

The upper frame may further include bearing members respectively disposed in a region in which the right extension member and the chest pad member are coupled and a region in which the left extension member and the chest pad member are coupled, and the bearing members may be configured to reduce a frictional force between the right extension member and the chest pad member and a frictional force between the left extension member and the chest pad member.

The apparatus may further include a waist surrounding unit configured to surround the user's waist, and the frame member may be fixedly coupled to the waist surrounding unit.

The force generating unit may be disposed within a leftward/rightward width of the waist surrounding unit.

The lower frame may include: lower extension members extending along the user's lower body; and thigh pad members disposed at lower ends of the lower extension members and configured to come into close contact with the user's thighs, the force generating unit may be provided in plural, the plurality of force generating units may be disposed in left and right regions of the waist surrounding unit, respectively, and a region X1 in which the right extension member and the chest pad member are coupled to each other, a region X2 in which the force generating unit disposed in the right region of the waist surrounding unit is coupled to the waist surrounding unit, and a region X3 in which the lower extension member and the thigh pad member, which are disposed on the user's right lower body, are coupled to each other may be disposed on one straight line.

A region Y1 in which the left extension member and the chest pad member are coupled to each other, a region Y2 in which the force generating unit disposed in the left region of the waist surrounding unit is coupled to the waist surrounding unit, and a region Y3 in which the lower extension member and the thigh pad member, which are disposed on the user's left lower body, are coupled to each other may be disposed on one straight line.

The lower extension member may include: a first lower extension member connected to a lower end of the link part; and a second lower extension member having one side rotatably coupled to a lower end of the first lower extension member and the other side coupled to the thigh pad member.

The first lower extension member may be coupled to be rotatable relative to the link part about an axis extending in a first direction, and the second lower extension member may be coupled to be rotatable relative to the first lower extension member about an axis extending in a second direction intersecting the first direction.

Another exemplary embodiment of the present disclosure provides an apparatus for assisting muscular strength, the apparatus including: an upper frame configured to be fixed to a user's upper body; a lower frame disposed below the upper frame and configured to be fixed to the user's lower body and rotatable relative to the upper frame; a force generating unit coupled to one side of the upper frame and configured to provide the lower frame with a force applied in a second rotational direction D2 opposite to a first rotational direction D1 when the lower frame rotates in the first rotational direction D1 relative to the upper frame; and a waist surrounding unit configured to surround the user's waist, in which the upper frame includes: a right extension member extending in an upward/downward direction and configured to come into contact with a right region of the user's body; a left extension member extending in the upward/downward direction and configured to come into contact with a left region of the user's body; and a chest pad member coupled to the right and left extension members and configured to come into contact with the user's chest region, and in which the force generating unit is fixedly coupled to the waist surrounding unit, and the force generating unit is disposed within a leftward/rightward width of the waist surrounding unit.

The lower frame may include: lower extension members extending along the user's lower body; and thigh pad members disposed at lower ends of the lower extension members and configured to come into close contact with the user's thighs, the force generating unit may be provided in plural, the plurality of force generating units may be disposed in left and right regions of the waist surrounding unit, respectively, and a region X1 in which the right extension member and the chest pad member are coupled to each other, a region X2 in which the force generating unit disposed in the right region of the waist surrounding unit is coupled to the waist surrounding unit, and a region X3 in which the lower extension member and the thigh pad member, which are disposed on the user's right lower body, are coupled to each other may be disposed on one straight line.

A region Y1 in which the left extension member and the chest pad member are coupled to each other, a region Y2 in which the force generating unit disposed in the left region of the waist surrounding unit is coupled to the waist surrounding unit, and a region Y3 in which the lower extension member and the thigh pad member, which are disposed on the user's left lower body, are coupled to each other may be disposed on one straight line.

According to embodiments of the present disclosure, it is possible to provide the apparatus for assisting muscular strength, which is capable of improving wearing comfort and durability by minimizing a torsional load generated during the operating process.

As discussed, the method and system suitably include use of a controller or processer.

DETAILED DESCRIPTION

Figure 1:
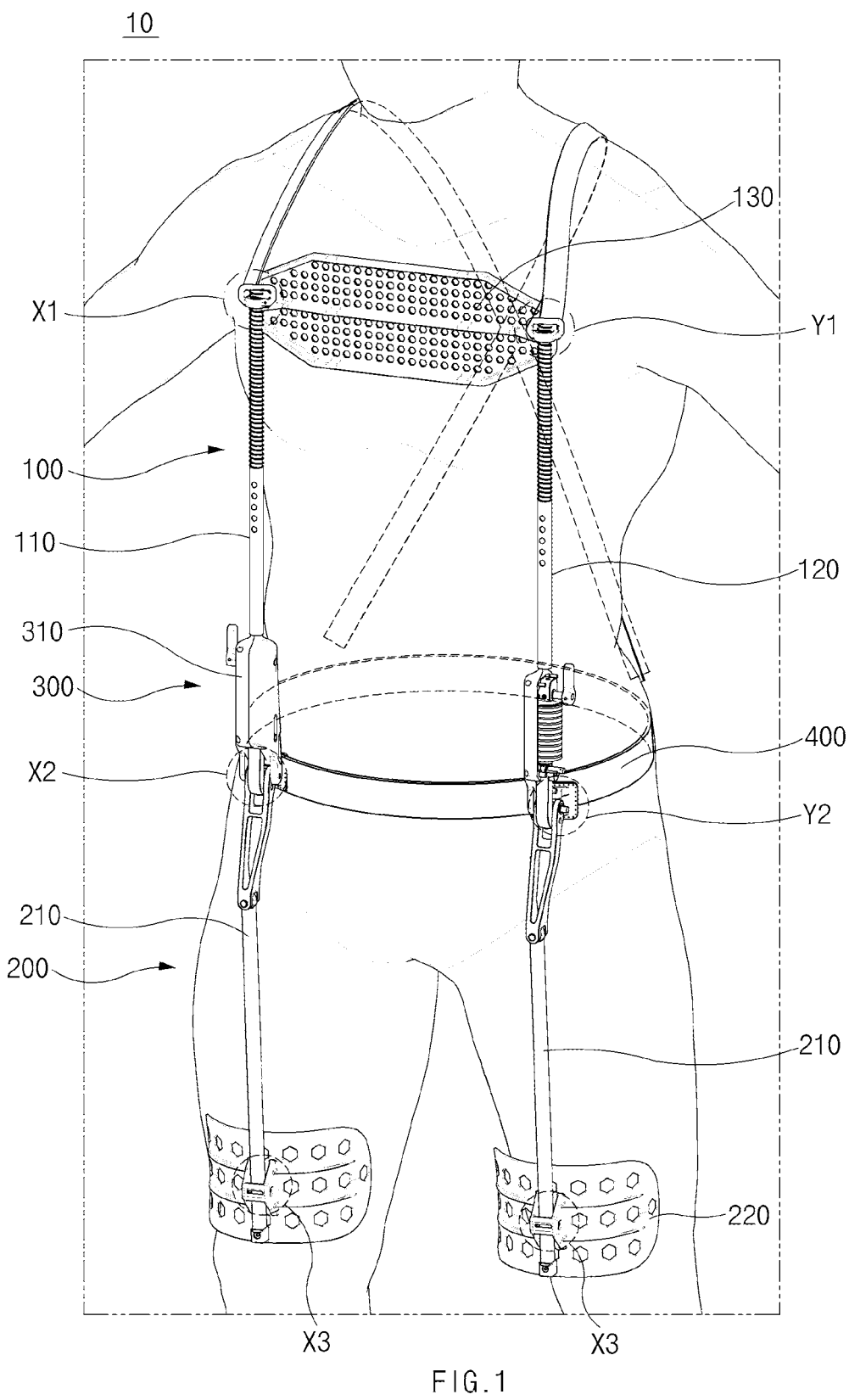
FIG. 1 is a view illustrating an apparatus for assisting muscular strength according to an embodiment of the present disclosure.

In order to fully understand the present disclosure and the object achieved by the implementation of the present disclosure, reference should be made to the accompanying drawings illustrating the exemplary embodiment of the present disclosure and the contents described in the accompanying drawings.

Hereinafter, the present disclosure will be described in detail by describing the exemplary embodiment of the present disclosure with reference to the accompanying drawings. In the following description of the exemplary embodiment, a detailed description of known configurations or functions incorporated herein will be omitted when it is judged that the detailed description may make the subject matter of the present disclosure unclear. Like reference numerals presented in each drawing designate like elements throughout the specification.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

APPARATUS FOR ASSISTING MUSCULAR STRENGTH

Figure 2:
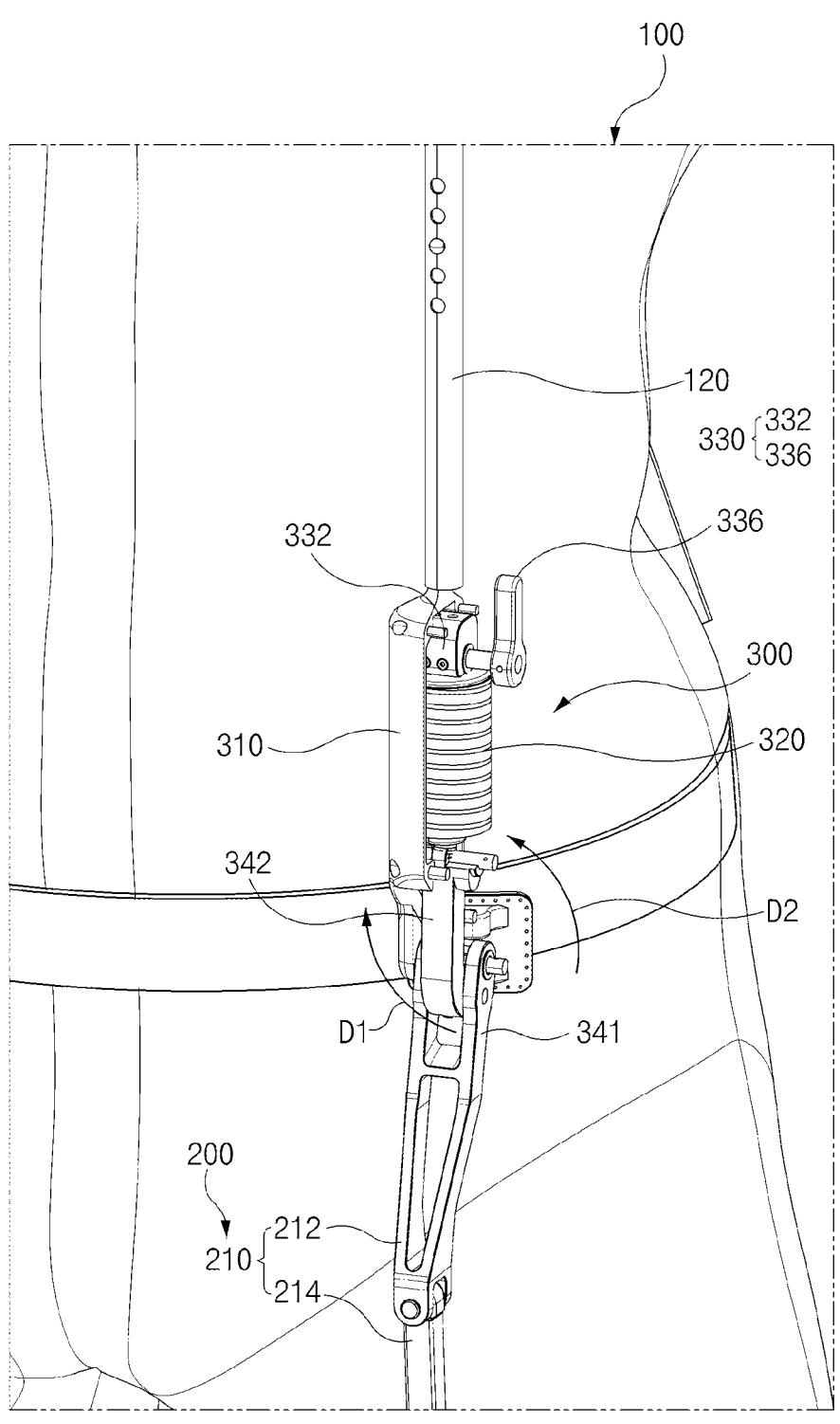
FIG. 2 is an enlarged view illustrating coupling structures between an upper frame, a lower frame, and a force generating unit provided in the apparatus for assisting muscular strength according to an embodiment of the present disclosure.
Figure 3:
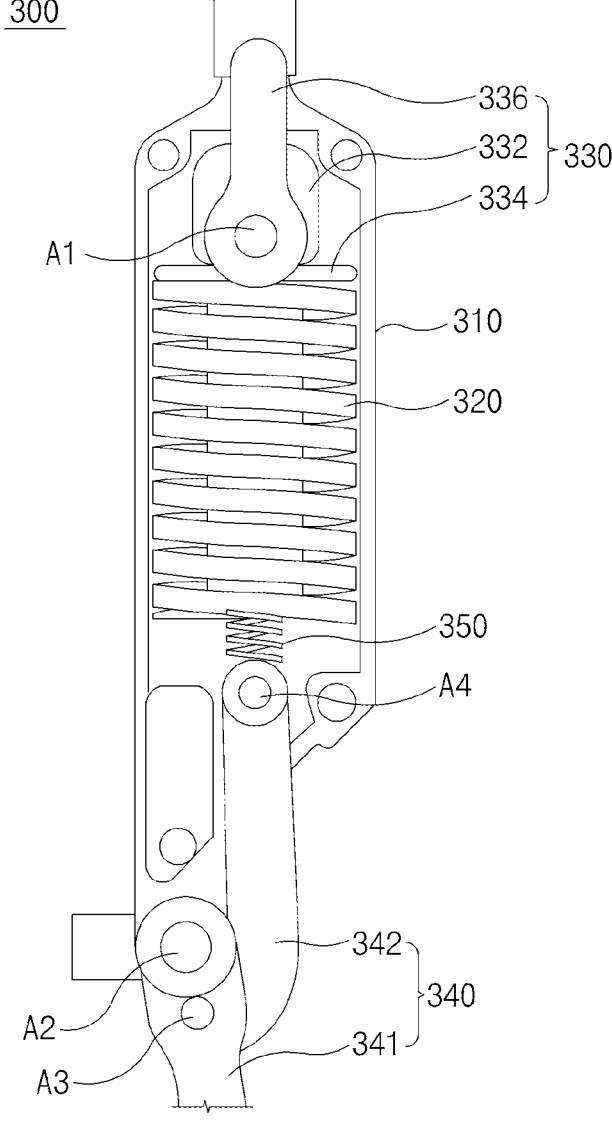
FIG. 3 is an enlarged side view illustrating an internal structure of the force generating unit according to an embodiment of the present disclosure.

FIG. 1 is a view illustrating an apparatus for assisting muscular strength according to an embodiment of the present disclosure, and FIG. 2 is an enlarged view illustrating coupling structures between an upper frame, a lower frame, and a force generating unit provided in the apparatus for assisting muscular strength according to an embodiment of the present disclosure. FIG. 3 is an enlarged side view illustrating an internal structure of the force generating unit according to an embodiment of the present disclosure.

An apparatus 10 for assisting muscular strength according to embodiments of the present disclosure may be configured to generate a force for assisting strength of a user's waist muscles. For example, when the user bends his/her waist, the apparatus 10 for assisting muscular strength may be configured to reduce a load applied to the user's waist by generating the force in the direction in which the user's waist is stretched. In addition, as described below, according to embodiments of the present disclosure, the user may optionally operate the apparatus for assisting muscular strength so that the apparatus for assisting muscular strength does not generate the force even though the user bends his/her waist in the state in which the user wears the apparatus for assisting muscular strength. Thus, the user may take postures, for example, sit in a chair or on the floor without taking off the apparatus for assisting muscular strength.

Referring to FIGS. 1 to 3, the apparatus 10 for assisting muscular strength according to embodiments of the present disclosure may include: an upper frame 100 configured to be fixed to a user's upper body; a lower frame 200 disposed below the upper frame 100 and configured to be fixed to the user's lower body and rotatable relative to the upper frame 100; and force generating units 300 coupled to one side of the upper frame 100 and configured to provide the lower frame 200 with a force applied in a second rotational direction D2 opposite to a first rotational direction D1 when the lower frame 200 rotates in the first rotational direction D1 relative to the upper frame 100. Since the lower frame 200 is rotatable relative to the upper frame 100, the user may walk or bend his/her waist in the state in which the user wears the apparatus 10 for assisting muscular strength. Meanwhile, as described below, according to embodiments of the present disclosure, the force may be generated from the inside of the force generating unit 300 according to a relative rotational motion between the upper and lower frames 100 and 200, and the force may be provided to assist the strength of the user's waist muscles. Meanwhile, in the present disclosure and the drawings, for the convenience of description, the relative rotational motions between the upper and lower frames 100 and 200 will be described on the basis of a direction in which the lower frame 200 rotates relative to the upper frame 100.

Referring to FIGS. 1 to 3, the force generating unit 300 may include a frame member 310 configured to define a body of the force generating unit 300. The frame member 310 does not merely mean a casing that surrounds an outer portion of the force generating unit 300 but may be understood as collectively representing components fixed relative to the upper and lower frames 100 and 200 regardless of motions of a first spring 320, a pressing part 330, a link part 340, and a second spring 350 which will be described below.

In addition, the force generating unit 300 may further include the first spring 320 accommodated in the frame member 310, the pressing part 330 disposed at one side of the first spring 320 and configured to press the first spring 320, and the link part 340 disposed at the other side of the first spring 320 and configured to press the first spring 320 and move in conjunction with the relative rotational motion between the upper and lower frames 100 and 200. As described below, according to embodiments of the present disclosure, when the link part 340 is moved by the relative rotational motion between the upper and lower frames 100 and 200, the link part 340 may press the first spring 320, and the compressed first spring 320 may press the link part 340 by applying a restoring force thereof. Therefore, the link part 340 may receive a force in a direction opposite to the movement direction of the link part 340, and as a result, the apparatus 10 for assisting muscular strength may generate the force for assisting the strength of the user's waist muscles.

Meanwhile, the pressing part 330 may include a block member 332 coupled to be rotatable about a first rotary shaft A1 fixed to the frame member 310.

The block member 332 may make a magnitude of a force applied by the first spring 320 to press the link part 340 different from a magnitude of a force applied by a second spring 350, which will be described below, to press the link part 340 even though a relative rotation angle between the upper and lower frames 100 and 200 remains the same. Therefore, the block member 332 may serve to produce various types of force profiles, more particularly, various types of torque profiles according to the user's demand.

In more detail, according to embodiments of the present disclosure, as the block member 332 rotates about the first rotary shaft A1, the positions at which the pressing part 330 and the first spring 320 may be in close contact with each other may be changed. That is, according to embodiments of the present disclosure, a distance between the first rotary shaft A1 and a region in which the pressing part 330 is in close contact with the first spring 320 may vary depending on a rotation angle of the block member 332. Therefore, according to embodiments of the present disclosure, the position at which the pressing part 330 is in close contact with the first spring 320 may vary depending on the rotation angle of the block member 332 even though a shape of the link part 340, which is defined by a relative positional relationship between the upper and lower frames 100 and 200, remains the same. This configuration means that a degree to which the first spring 320 is compressed varies, an elastic force generated by the first spring 320 also varies, and as a result, a magnitude of the force applied by the first spring 320 to press the link part 340 varies. Therefore, according to embodiments of the present disclosure, the force generating unit 300 may generate various types of force profiles with respect to the rotation angles of the block member 332.

In more detail, the pressing part 330 may further include a support member 334 disposed at one side of the block member 332, provided separately from the block member 332, and configured to come into contact with the first spring 320. In this case, a distance between the support member 334 and the first rotary shaft A1 may vary depending on the rotation angle of the block member 332. Therefore, the position at which the support member 334 and the first spring 320 are in close contact with each other may also vary.

According to embodiments of the present disclosure, a geometric center of the block member 332 may be spaced apart from a rotation center of the first rotary shaft A1 so that the region in which the pressing part 330 and the first spring 320 are in close contact with each other may vary depending on the rotation angle of the block member 332 as described above. The geometric center may be defined as a center of gravity of a certain object when only a geometric shape of the object is considered without considering a difference in density between regions of the object. For example, FIGS. 3 to 6 illustrate that the block member 332 has an approximately square vertical cross-section, and a center of gravity of the square is spaced apart from the rotation center of the first rotary shaft A1.

Meanwhile, in an exemplary embodiment, as illustrated in FIG. 3, the block member 332 and the support member 334 may be disposed above the first spring 320, and the link part 340 may be disposed below the first spring 320. In addition, the first spring 320 may be fixed to the support member 334. Therefore, the support member 334 and the first spring 320 may move together in an upward/downward direction.

Figure 4:
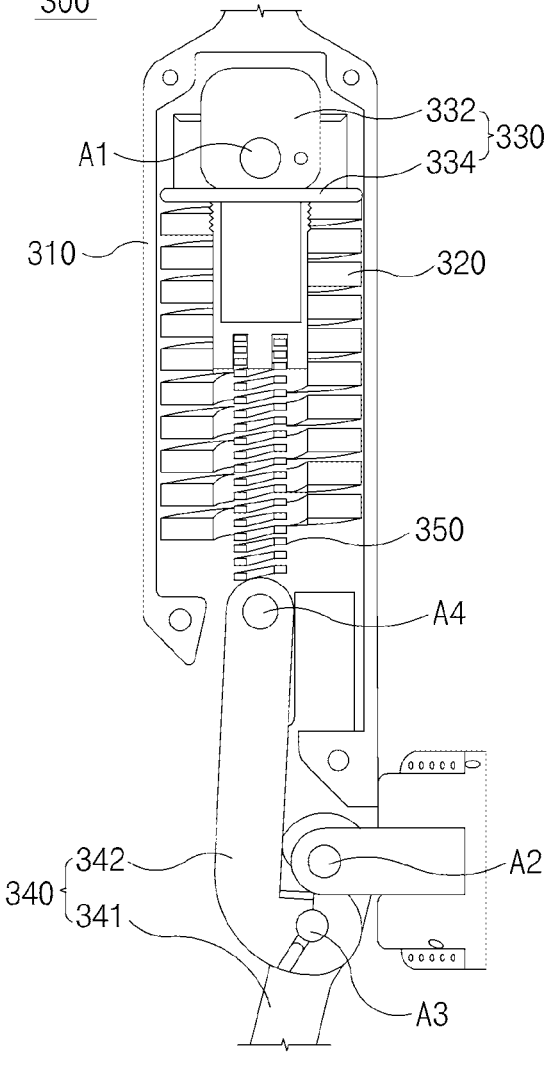
FIG. 4 is a cross-sectional view illustrating a state of the force generating unit when a block member provided in the force generating unit is positioned at a first rotation position.
Figure 5:
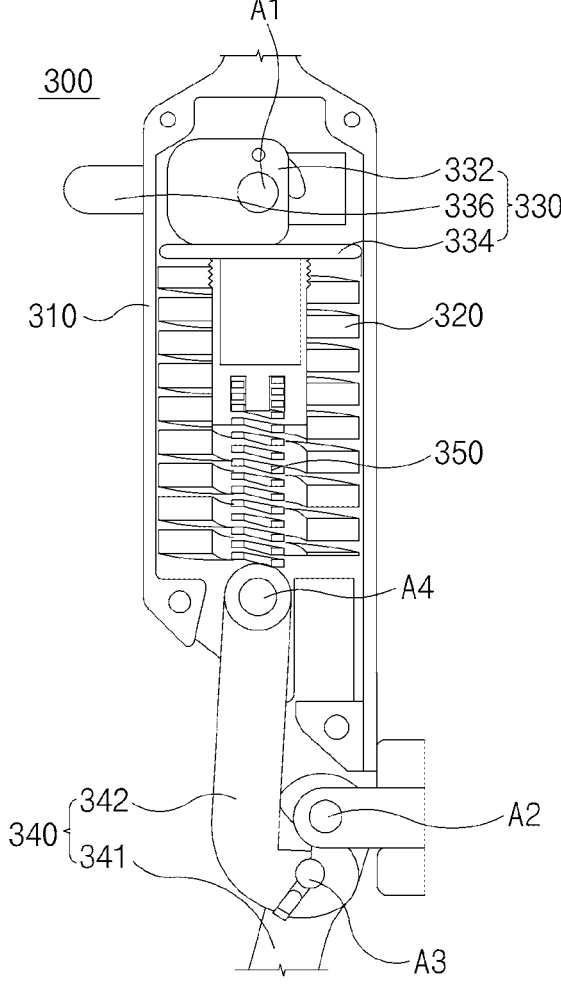
FIG. 5 is a cross-sectional view illustrating a state of the force generating unit when the block member provided in the force generating unit is positioned at a second rotation position.
Figure 6:
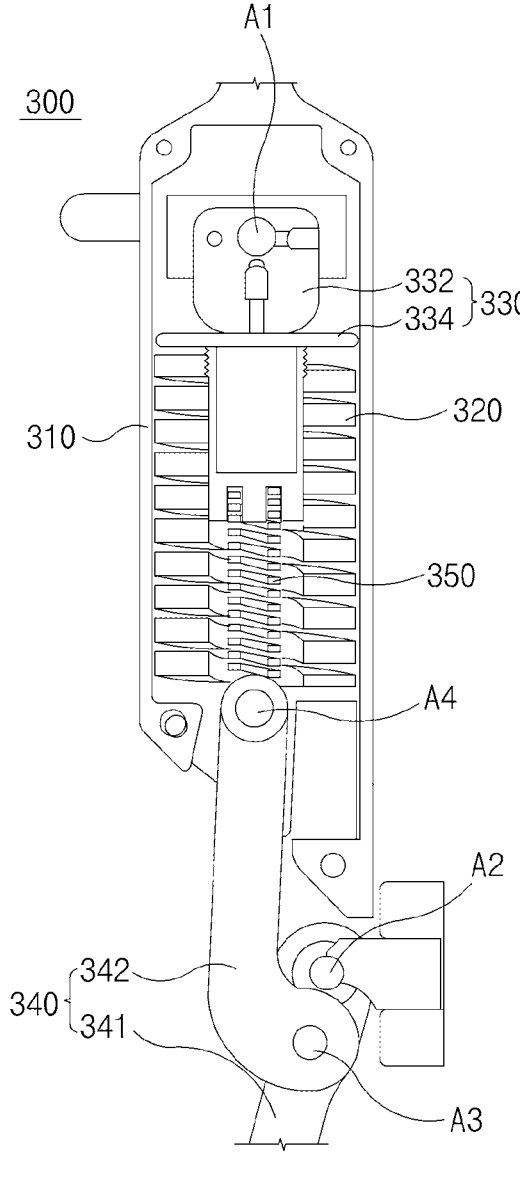
FIG. 6 is a cross-sectional view illustrating a state of the force generating unit when the block member provided in the force generating unit is positioned at a third rotation position.

FIG. 4 is a cross-sectional view illustrating a state of the force generating unit when the block member provided in the force generating unit is positioned at a first rotation position, and FIG. 5 is a cross-sectional view illustrating a state of the force generating unit when the block member provided in the force generating unit is positioned at a second rotation position. FIG. 6 is a cross-sectional view illustrating a state of the force generating unit when the block member provided in the force generating unit is positioned at a third rotation position.

As illustrated in FIG. 4, when the block member 332 rotates so that the first rotary shaft A1 and the support member 334 become closest to each other, the region in which the support member 334 and the first spring 320 are in close contact with each other also becomes closest to the first rotary shaft A1. Therefore, the first spring 320 may be spaced apart upward from the link part 340. Therefore, in this case, the first spring 320 does not press the link part 340. Meanwhile, in the present disclosure, as illustrated in FIG. 4, the state in which the first rotary shaft A1 and the support member 334 become closest to each other is defined as the state in which the block member is positioned at the first rotation position.

However, the first spring 320 may be compressed upward and presses the link part 340 downward by applying the elastic force thereof when the link part 340 rotates and presses the first spring 320 even though the block member 332 is positioned at the first rotation position. This is based on the fact that when the lower frame 200 rotates in the first rotational direction D1 by a predetermined rotation angle or more relative to the upper frame 100, a force is applied to the lower frame 200 in the second rotational direction D2 opposite to the first rotational direction D1. Therefore, according to embodiments of the present disclosure, when a user wears the apparatus 10 for assisting muscular strength and bends his/her waist at a predetermined angle or more, a force may be generated in a direction in which the user's waist is stretched by the elastic force of the first spring 320, and thus the apparatus 10 may assist the strength of the user's waist muscles.

Meanwhile, as illustrated in FIG. 5, when the block member 332 rotates so that the distance between the first rotary shaft A1 and the support member 334 becomes longer than the distance when the block member 332 is positioned at the first rotation position, the region in which the support member 334 and the first spring 320 are in close contact with each other becomes somewhat distant from the first rotary shaft A1. In addition, the first spring 320 may be moved further downward than when the block member 332 is positioned at the first rotation position. Therefore, the distance at which the first spring 320 is spaced apart from the link part 340 may become shorter than when the block member 332 is positioned at the first rotation position. In the present disclosure, as illustrated in FIG. 5, the state in which the first spring 320 does not press the link part 340 and the distance between the first rotary shaft A1 and the support member 334 is somewhat longer than the distance when the block member 332 is positioned at the first rotation position is defined as the state in which the block member is positioned at the second rotation position.

Meanwhile, similar to the state in which the block member 332 is positioned at the first rotation position, the first spring 320 may be compressed upward and press the link part 340 downward by applying the elastic force thereof when the link part 340 rotates and presses the first spring 320, even in the state in which the block member 332 is positioned at the second rotation position. This is based on the fact that when the lower frame 200 rotates in the first rotational direction D1 by a predetermined rotation angle or more relative to the upper frame 100, a force may be applied to the lower frame 200 in the second rotational direction D2 opposite to the first rotational direction D1. Therefore, according to embodiments of the present disclosure, when a user wears the apparatus 10 for assisting muscular strength and bends his/her waist at a predetermined angle or more, a force may be generated in a direction in which the user's waist is stretched by the elastic force of the first spring 320, and thus the apparatus 10 may assist the strength of the user's waist muscles. However, when the block member 332 is positioned at the second rotation position, a waist bending angle at which the force for assisting the strength of the waist muscles begins to be generated is smaller than when the block member 332 may be positioned at the first rotation position. Therefore, the effect of assisting the strength of the user's waist muscles may be further increased even though the user bends his/her waist at a relatively small angle. Therefore, according to embodiments of the present disclosure, it is possible to provide various types of force profiles by changing the rotation positions of the block member 332.

Meanwhile, as illustrated in FIG. 6, when the block member 332 rotates so that the first rotary shaft A1 and the support member 334 become farthest from each other, the region in which the support member 334 and the first spring 320 are in close contact with each other also becomes farthest from the first rotary shaft A1. In this case, since the first spring 320 is in contact with the link part 340, the first spring 320 may be in a state in which the first spring 320 may be compressed immediately when the link part 340 moves upward or a state in which the first spring 320 may be in close contact with the link part 340 and press the link part 340. In the present disclosure, as illustrated in FIG. 6, the state in which the first rotary shaft A1 and the support member 334 are farthest from each other is defined as the state in which the block member is positioned at the third rotation position.

Meanwhile, in the state in which the block member 332 is positioned at the third rotation position, the first spring 320 may be compressed upward immediately when the link part 340 begins to rotate, and the first spring 320 may press the link part 340 downward by applying the elastic force thereof, unlike the state in which the block member 332 is positioned at the first or second rotation position. Therefore, according to embodiments of the present disclosure, immediately when the user begins to bend his/her waist in the state in which the user wears the apparatus 10 for assisting muscular strength, a force may be generated in the direction in which the user's waist is stretched by the elastic force of the first spring 320, and thus the apparatus 10 may assist the strength of the user's waist muscles. Therefore, it is possible to provide another force profile different in shape from the force profiles provided when the block member 332 is positioned at the first or second rotation position.

Referring to FIG. 3, the force generating unit 300 according to embodiments of the present disclosure may further include the second spring 350 disposed between the pressing part 330 and the link part 340 and having one end facing the pressing part 330 and the other end facing the link part 340. Similar to the first spring 320, the second spring 350 may also be fixed to the support member 334. Therefore, the support member 334 and the second spring 350 may move together in the upward/downward direction.

When the user wears the apparatus 10 for assisting muscular strength, the second spring 350 may serve to provide a close-contact force to bring the upper and lower frames 100 and 200 into close contact with the user. That is, as described above, there is a section in which the first spring 320 does not press the link part 340 when the block member 332 is positioned at the first or second rotation position. In this case, the link part 340 may receive no force from the first spring 320. Therefore, when the first spring 320 applies no force to the link part 340 in the state in which the user wears the apparatus 10 for assisting muscular strength, there is no force for rotating the lower frame 200 in the second rotational direction D2 relative to the upper frame 100, and the upper and lower frames 100 and 200 cannot properly come into close contact with the user.

Therefore, the second spring 350 may press the link part 340 regardless of whether the first spring 320 presses the link part 340, such that the upper and lower frames 100 and 200 may be in close contact with the user. To this end, according to embodiments of the present disclosure, the second spring 350 may have a length that enables the second spring 350 to always press the link part 340 regardless of the rotation angle of the block member 332 and the position of the link part 340. For example, a length of the second spring 350 may be longer than a length of the first spring 320 in a state in which there is no external force. Alternatively, a lower end of the second spring 350 may be disposed below a lower end of the first spring 320 in the state in which there is no external force. In addition, because the second spring 350 only needs to provide a close-contact force that enables the upper and lower frames 100 and 200 to come into close contact with the user, an elastic modulus of the first spring 320 may be remarkably larger than an elastic modulus of the second spring 350. That is, the elastic modulus of the second spring 350 may be remarkably smaller than the elastic modulus of the first spring 320.

In addition, as another example, as illustrated in FIGS. 3 to 6, a diameter of the second spring 350 may be smaller than a diameter of the first spring 320, and the second spring 350 may be inserted into the first spring 320. This may be to minimize a volume occupied by the force generating unit 300.

Meanwhile, as illustrated in FIGS. 3 to 6, the link part 340 may include a plurality of links. In more detail, the link part 340 may include: a first link 341 having one side rotatably coupled to a second rotary shaft A2 fixed to the frame member 310 and the other side connected to the lower frame 200; and a second link 342 having one side rotatably coupled to the first link 341 through a third rotary shaft A3 and the other side being movable in the upward/downward direction. Therefore, according to embodiments of the present disclosure, the first and second springs 320 and 350 may be contracted or expanded as the other side of the second link 342 moves in the upward/downward direction.

In more detail, the frame member 310 may have a groove region (not illustrated) extending in the upward/downward direction. In this case, the other side of the second link 342 may be disposed in the frame member 310, inserted into the groove region, and rotatably coupled to a fourth rotary shaft A4 provided to be rotatable in the upward/downward direction. The groove region may have a shape made by recessing a partial region of the frame member 310 or a shape of a hole penetrating a partial region of the frame member 310.

Figure 7:
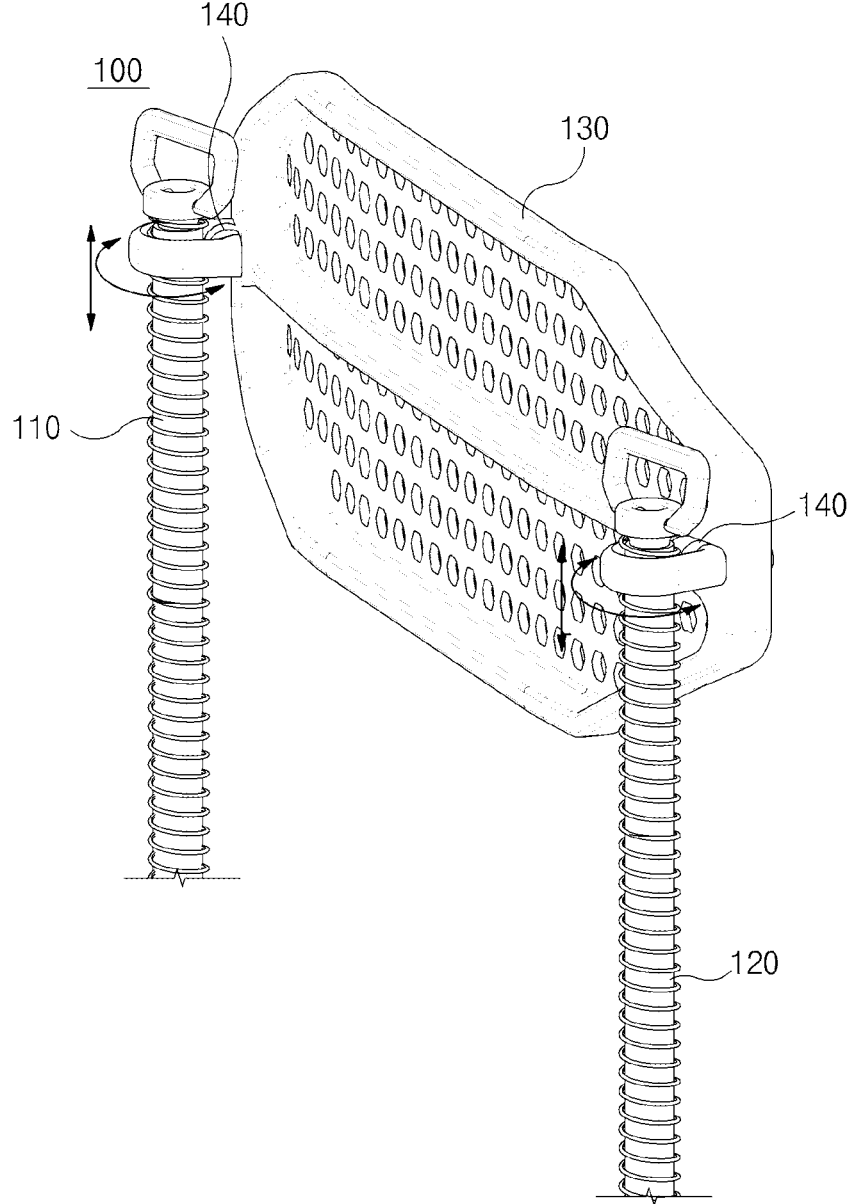
FIG. 7 is an enlarged view of a structure of the upper frame.

FIG. 7 is an enlarged view of a structure of the upper frame.

Referring to FIG. 7, the upper frame 100 may include: a right extension member 110 extending in the upward/downward direction and configured to come into contact with a right region of the user's body; a left extension member 120 extending in the upward/downward direction and configured to come into contact with a left region of the user's body; and a chest pad member 130 coupled to the right and left extension members 110 and 120 and configured to come into contact with the user's chest region.

In this case, according to embodiments of the present disclosure, the chest pad member 130 may be coupled to be movable in the upward/downward direction relative to the right extension member 110 and rotatable about an axis extending in a direction in which the right extension member 110 extends. In addition, the chest pad member 130 may be coupled to be movable in the upward/downward direction relative to the left extension member 120 and rotatable about an axis extending in a direction in which the left extension member 120 extends. Therefore, according to embodiments of the present disclosure, when the user turns his/her waist or bends his/her upper body from side to side in the state in which the user wears the apparatus 10 for assisting muscular strength, relative positions between the right extension member 110, the left extension member 120, and the chest pad member 130 may be freely changed, such that the apparatus 10 may effectively cope with the user's motions.

In addition, according to embodiments of the present disclosure, the upper frame 100 may further include bearing members 140 respectively disposed in a region in which the right extension member 110 and the chest pad member 130 are coupled to each other and a region in which the left extension member 120 and the chest pad member 130 are coupled to each other. The bearing members 140 may serve to reduce a frictional force between the right extension member 110 and the chest pad member 130 and a frictional force between the left extension member 120 and the chest pad member 130, thereby improving durability of the upper frame 100 and improving the user's wearing comfort.

In addition, as illustrated in FIG. 1, the apparatus 10 for assisting muscular strength may further include a waist surrounding unit 400 configured to surround the user's waist. In this case, the frame members 310 may be fixedly coupled to the waist surrounding unit 400.

In addition, according to embodiments of the present disclosure, the force generating units 300 may be provided within a leftward/rightward width of the waist surrounding unit 400. In this case, the force generating units 300 may not protrude from the user's two opposite sides based on the leftward/rightward direction in the state in which the user wears the apparatus 10 for assisting muscular strength. Therefore, the user may rest while being comfortably seated in a chair with armrests.

Referring to FIG. 1, the lower frame 200 may include lower extension members 210 extending along the user's lower body, and thigh pad members 220 respectively provided at lower ends of the lower extension members 210 and configured to come into close contact with the user's thighs.

In this case, the force generating units 300 may be disposed in left and right regions of the waist surrounding unit 400, respectively.

In addition, a region X1 in which the right extension member 110 and the chest pad member 130 are coupled to each other, a region X2 in which the force generating unit 300 disposed in the right region of the waist surrounding unit 400 is coupled to the waist surrounding unit 400, and a region X3 in which the lower extension member 210 and the thigh pad member 220, which are disposed on the user's right lower body, are coupled to each other may be disposed on one straight line. Likewise, a region Y1 in which the left extension member 120 and the chest pad member 130 are coupled to each other, a region Y2 in which the force generating unit 300 disposed in the left region of the waist surrounding unit 400 is coupled to the waist surrounding unit 400, and a region Y3 in which the lower extension member 210 and the thigh pad member 220, which are disposed on the user's left lower body, may be coupled to each other may also be disposed on one straight line. Therefore, according to embodiments of the present disclosure, it is possible to prevent a torsional load from being applied to the force generating unit 300 during a process in which the upper and lower frames 100 and 200 rotate relative to each other, which makes it possible to improve wearing comfort and durability of the apparatus for assisting muscular strength.

Meanwhile, as illustrated in FIG. 2, the lower extension member 210 may be divided into a plurality of regions. In more detail, the lower extension member 210 may include: a first lower extension member 212 connected to a lower end of the link part 340, more specifically, a lower end of the first link 341; and a second lower extension member 214 having one side rotatably coupled to a lower end of the first lower extension member 212 and the other side coupled to the thigh pad member 220. As illustrated in FIG. 1, the first link 341 and the first lower extension member 212 may be integrally formed.

In this case, according to embodiments of the present disclosure, a direction of a rotation of the first link 341 and the first lower extension member 212 relative to the second link 342 may be different from a direction of a rotation of the second lower extension member 214 relative to the first lower extension member 212. In more detail, the first link 341 and the first lower extension member 212 may be coupled to be rotatable relative to the second link 342 about an axis extending in a first direction, and the second lower extension member 214 may be coupled to be rotatable relative to the first lower extension member 212 about an axis extending in a second direction intersecting the first direction. For example, as illustrated in FIGS. 1 and 2, the first direction may be a leftward/rightward direction, and the second direction may be a forward/rearward direction.

Meanwhile, the apparatus 10 for assisting muscular strength according to embodiments of the present disclosure may further include a lever member 336 fixedly coupled to the block member 332 so that the user may rotate the block member 332 by using the lever member 336. The lever member 336 may be disposed outside the frame member 310, such that the user may manipulate the lever member 336. For example, as illustrated in FIG. 2 and the like, the lever member 336 may include a long rod structure so that the user may easily grasp and manipulate the lever member 336. The lever member 336 may rotate together with the block member 332 about the first rotary shaft A1.

Hereinafter, a method of operating the apparatus 10 for assisting muscular strength according to embodiments of the present disclosure will be described with reference to the drawings.

Figure 8:
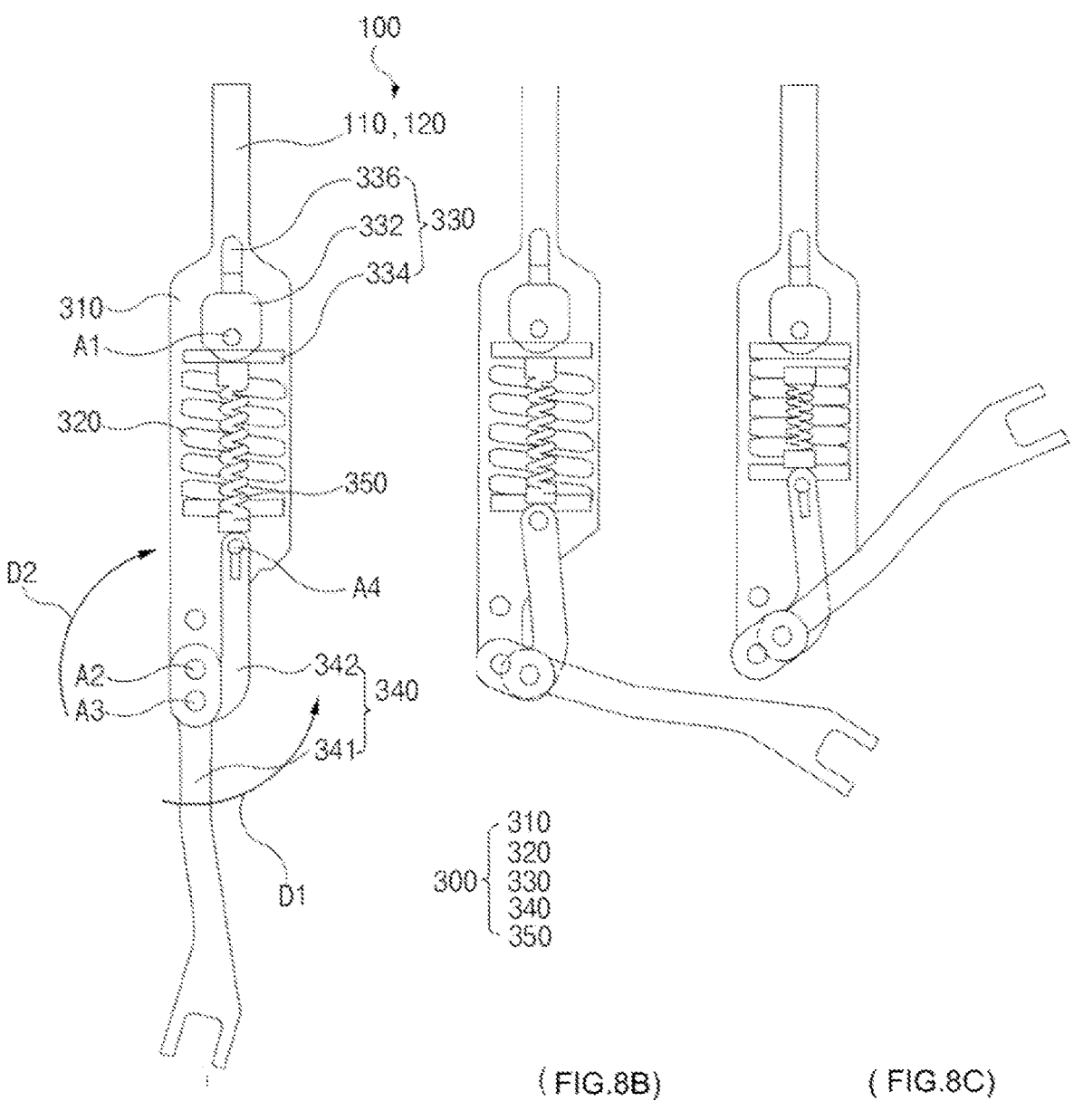
FIGS. 8A to 8C are views illustrating states in which a link part provided in the force generating unit rotates when the block member is positioned at the first rotation position.
Figure 9:
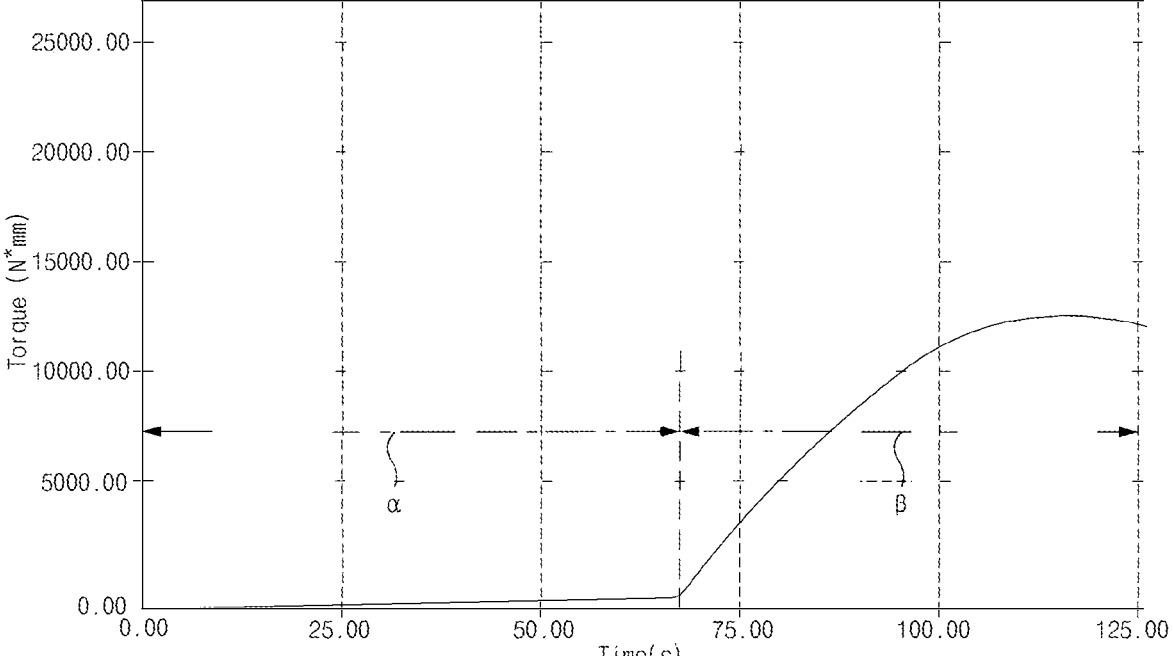
FIG. 9 is a graph illustrating torque generated by the force generating unit with respect to a rotation angle of the link part when the block member is positioned at the first rotation position.
Figure 10:
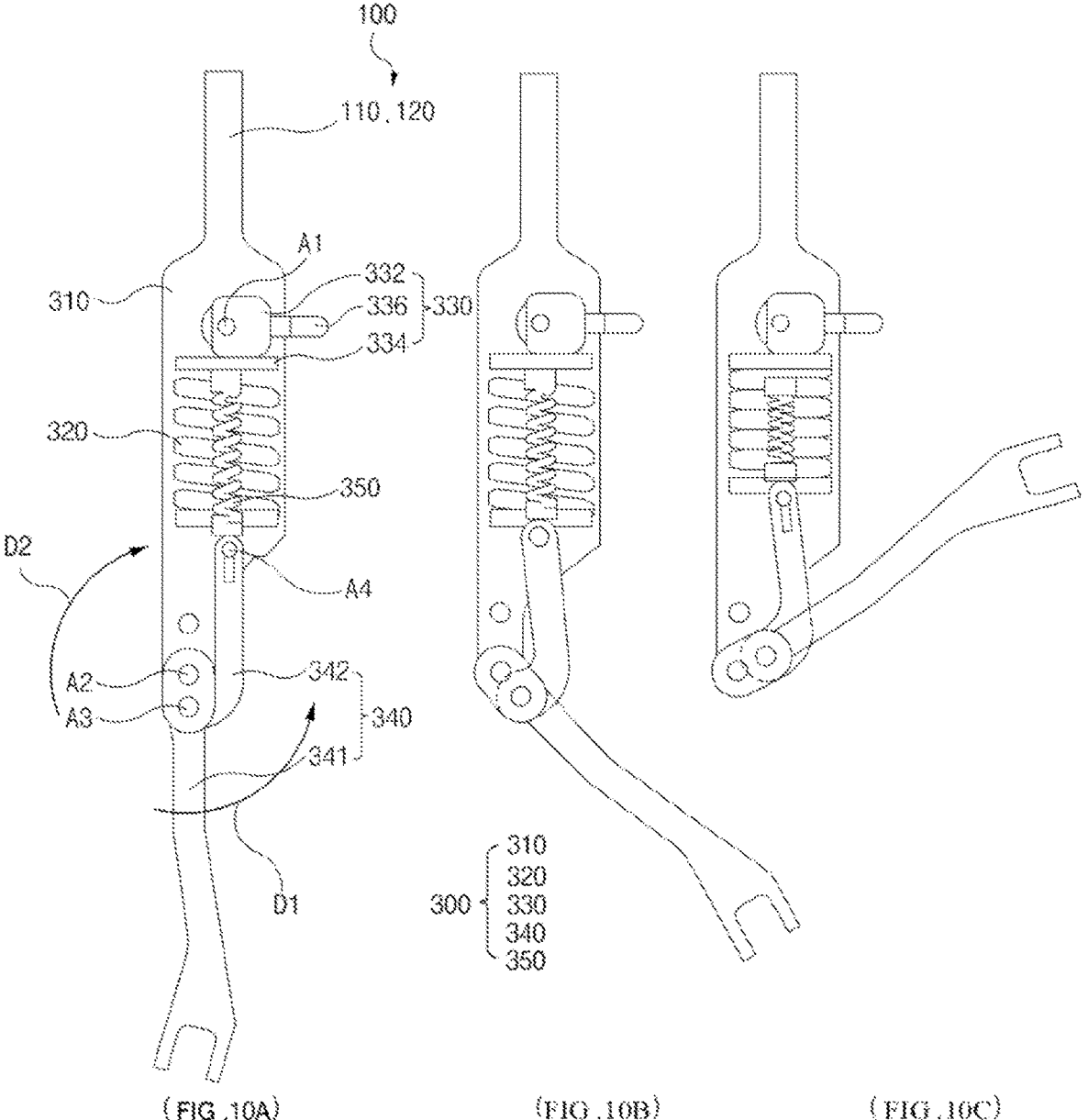
FIGS. 10A to 10C are views illustrating states in which the link part provided in the force generating unit rotates when the block member is positioned at the second rotation position.
Figure 11:
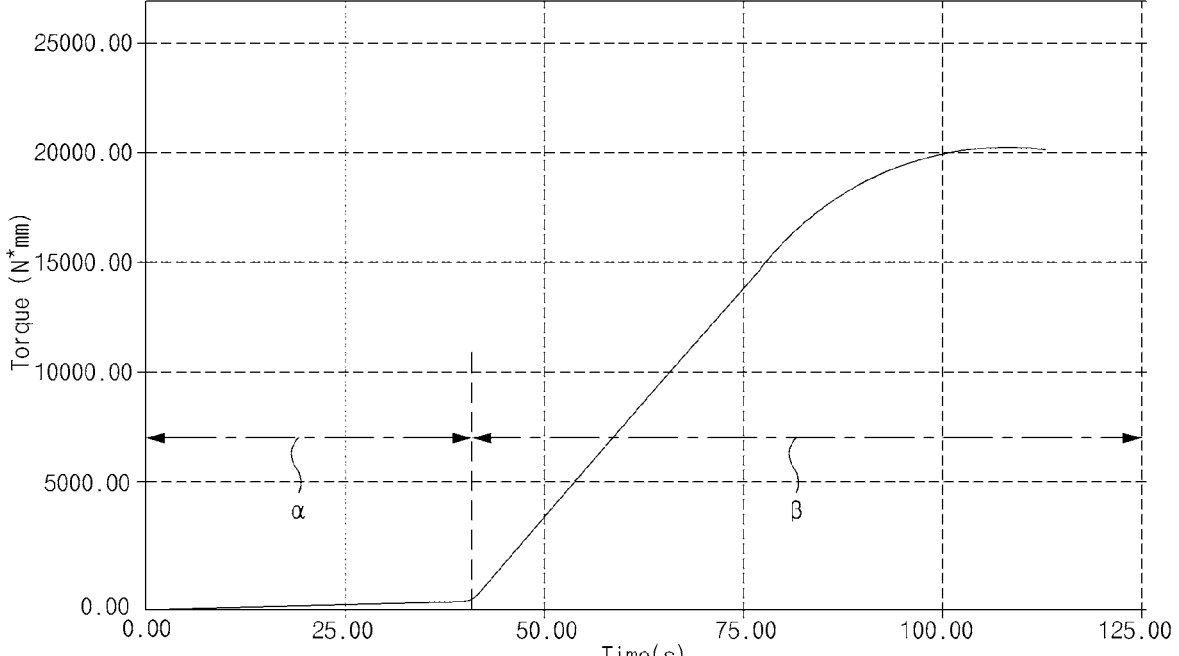
FIG. 11 is a graph illustrating torque generated by the force generating unit with respect to a rotation angle of the link part when the block member is positioned at the second rotation position.
Figure 12:
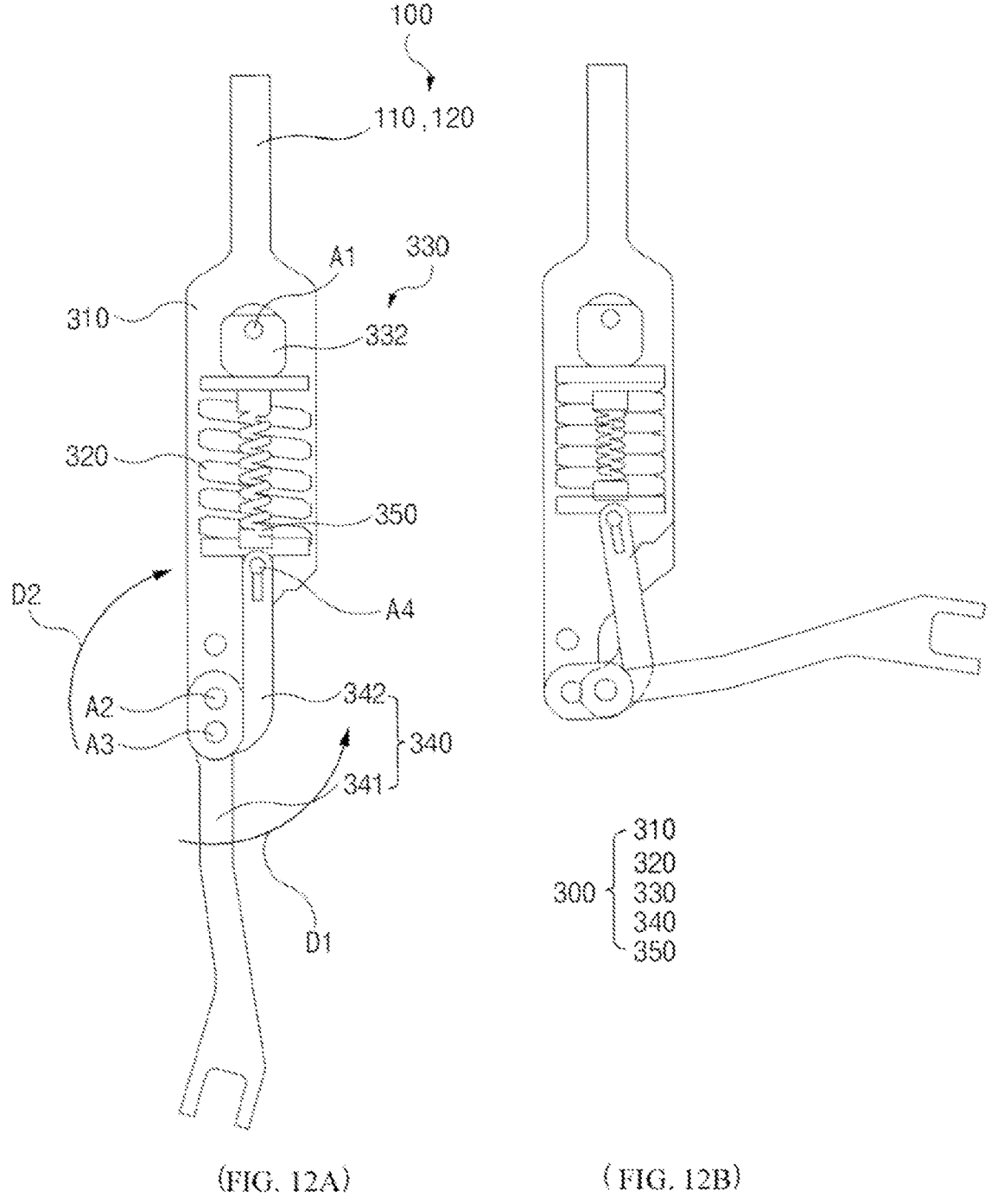
FIGS. 12A and 12B are views illustrating states in which the link part provided in the force generating unit rotates when the block member is positioned at the third rotation position.
Figure 13:
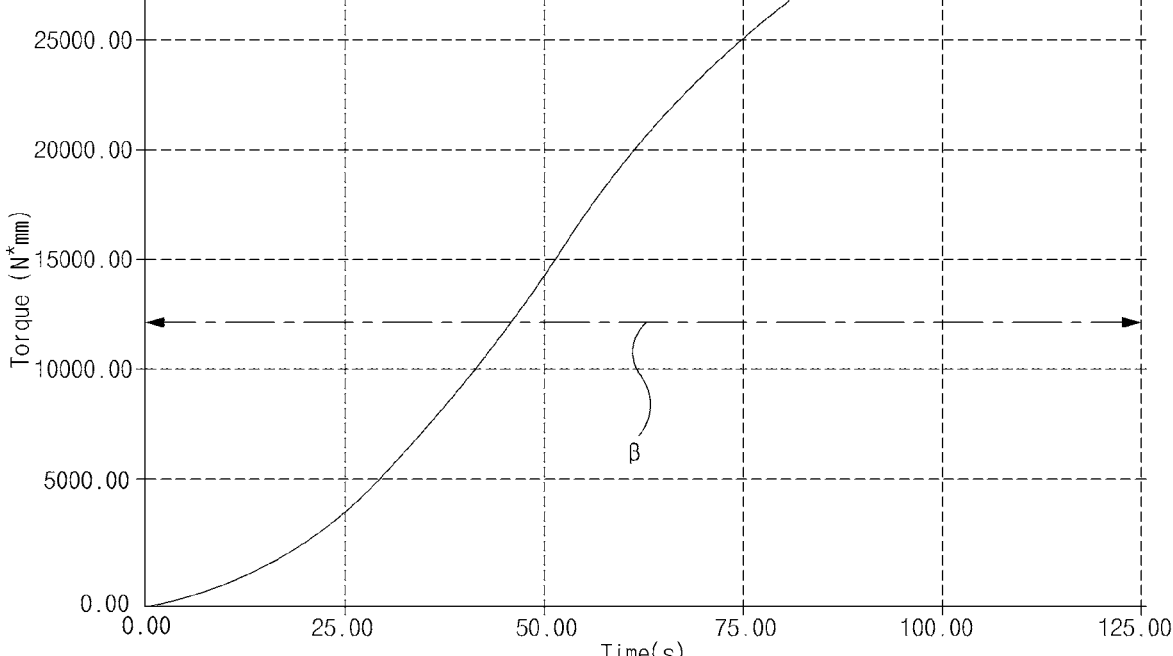
FIG. 13 is a graph illustrating torque generated by the force generating unit with respect to a rotation angle of the link part when the block member is positioned at the third rotation position.

FIGS. 8A to 8C are views illustrating states in which the link part provided in the force generating unit rotates when the block member is positioned at the first rotation position, and FIG. 9 is a graph illustrating the profile of torque generated by the force generating unit with respect to a rotation angle of the link part when the block member is positioned at the first rotation position. FIGS. 10A to 10C are views illustrating states in which the link part provided in the force generating unit rotates when the block member is positioned at the second rotation position, and FIG. 11 is a graph illustrating the profile of torque generated by the force generating unit with respect to a rotation angle of the link part when the block member is positioned at the second rotation position. FIGS. 12A and 12B are views illustrating states in which the link part provided in the force generating unit rotates when the block member is positioned at the third rotation position, and FIG. 13 is a graph illustrating the profile of torque generated by the force generating unit with respect to a rotation angle of the link part when the block member is positioned at the third rotation position.

In a state in which the lower frame 200 is not rotated relative to the upper frame 100 (FIG. 8A), i.e., the user does not bend his/her waist when the block member 332 is positioned at the first rotation position, the first link 341 connected to the lower frame 200 may extend downward, and the second link 342 may be spaced apart from the first spring 320. Therefore, the first spring 320 may apply no force to the second link 342. However, since the second spring 350 is always in contact with the second link 342 as described above, the upper and lower frames 100 and 200 of the apparatus 10 for assisting muscular strength may be kept in close contact with the user's upper and lower bodies, respectively.

Thereafter, when the lower frame 200 rotates in the first rotational direction D1 relative to the upper frame 100 (i.e., the user bends his/her waist), the first link 341 may also rotate in the first rotational direction D1, and the second link 342 may move upward in conjunction with the rotational motion of the first link 341. Therefore, the second link 342 may press the second spring 350 upward, and the second spring 350 may be compressed, such that the force applied by the second spring 350 to press the second link 342 may increase. However, since the elastic modulus of the second spring 350 is remarkably smaller than the elastic modulus of the first spring 320 as described above, a change in elastic force of the second spring 350, which is caused by the movement of the second link 342, may be also remarkably small. Therefore, the elastic force provided by the second spring 350 may not provide torque sufficient to assist the strength of the user's waist muscles but still provide only the close-contact force that may bring the upper and lower frames 100 and 200 into close contact with the user. Thereafter, when the lower frame 200 continuously rotates in the first rotational direction D1 relative to the upper frame 100, the second link 342 and the first spring 320 may come into contact with each other (FIG. 8B). In this step, the first spring 320 may not yet be compressed by the second link 342, and the first spring 320 does not press the second link 342. A change in torque, which is generated by the force generating unit 300 according to the motions of the link part 340 from the state illustrated in FIG. 8A to the state illustrated in FIG. 8B, is shown in Section α in FIG. 9.

Thereafter, when the lower frame 200 continuously rotates in the first rotational direction D1 relative to the upper frame 100, the second link 342 may press the first spring 320, and the first spring 320 may begin to be contracted (FIG. 8C). Therefore, the first spring 320 may press the second link 342 downward, and the first link 341 may receive a force in the second rotational direction D2 opposite to the first direction. The force may be transmitted to the lower frame 200, and the lower frame 200 may also receive the force in the second rotational direction D2 relative to the upper frame 100. The force may act as a force for assisting the strength of the user's waist muscles. A change in torque, which is generated by the force generating unit 300 according to the motions of the link part 340 from the state illustrated in FIG. 8B to the state illustrated in FIG. 8C, is shown in Section β in FIG. 9. As can be seen from FIG. 9, in the section from the state illustrated in FIG. 8B to the state illustrated in FIG. 8C, the torque may be greatly changed with respect to the rotation angle of the lower frame 200 because the first spring 320 presses the second link 342.

The contents identical to the contents described with reference to FIGS. 8 and 9 may also apply to the case in which the block member 332 is positioned at the second rotation position. However, referring to FIGS. 10 and 11, because the first and second springs 320 and 350 are in the state of being moved downward when the block member 332 is positioned at the second rotation position, the rotation angle of the first link 341 may be relatively small when the second link 342 begins to press the first spring 320. It can be seen that Section α is shortened and Section β is shifted left in the state illustrated in FIG. 11 in comparison with the state illustrated in FIG. 9. Therefore, in the state in which the block member 332 is positioned at the second rotation position, the user may more quickly receive a force for assisting muscular strength from the apparatus 10 for assisting muscular strength when the user begins to bent his/her waist, or the user may receive a larger force for assisting muscular strength from the apparatus 10 for assisting muscular strength than in the state in which the block member 332 is positioned at the first rotation position, even though the angle by which the user bends his/her waist remains the same.

Meanwhile, in the state in which the block member 332 is positioned at the third rotation position, the user may receive the force for assisting muscular strength from the first spring 320 immediately from the moment when the user begins to bend his/her waist, unlike the state in which the block member 332 is positioned at the first or second rotation position. That is, since the first spring 320 is in contact with the link part 340 in the state in which the block member 332 is positioned at the third rotation position as described above, the first spring 320 may be in a state in which the first spring 320 may be compressed immediately when the link part 340 moves upward or a state in which the first spring 320 may be in close contact with the link part 340 and press the link part 340. Therefore, the user may receive the force for assisting muscular strength from the apparatus 10 for assisting muscular strength immediately when the user begins to bend his/her waist. Furthermore, the user may receive a larger force for assisting muscular strength from the apparatus 10 for assisting muscular strength than in the state in which the block member 332 is positioned at the first or second rotation position, even though the angle by which the user bends his/her waist remains the same. It can be seen that Section α disappears and only Section β is present in the state illustrated in FIG. 13 in comparison with the states illustrated in FIGS. 9 and 11.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. An apparatus for assisting muscular strength, the apparatus comprising:
    an upper frame configured to be fixed to a user's upper body;
    a lower frame disposed below the upper frame and configured to be fixed to the user's lower body and rotatable relative to the upper frame; and
    a force generating unit coupled to one side of the upper frame and configured to provide the lower frame with a force applied in a second rotational direction opposite to a first rotational direction when the lower frame rotates in the first rotational direction relative to the upper frame,
    wherein the force generating unit comprises:
    a frame member configured to define a body of the force generating unit;
    a first spring accommodated in the frame member;
    a pressing part disposed at one side of the first spring and configured to press the first spring; and
    a link part disposed at the other side of the first spring and configured to press the first spring and move in conjunction with a relative rotational motion between the upper frame and the lower frame;
    wherein the pressing part comprises a block member coupled to be rotatable about a first rotary shaft fixed to the frame member;

wherein the pressing part further comprises a support member disposed at one side of the block member, provided separately from the block member, and configured to come into contact with the first spring;
    wherein the force generating unit further comprises a second spring disposed between the pressing part and the link part and having one end facing the pressing part and the other end facing the link part;
    wherein the link part comprises:
        a first link having one side rotatably coupled to a second rotary shaft fixed to the frame member and the other side connected to the lower frame; and
        a second link having one side rotatably coupled to the first link through a third rotary shaft and the other side provided to be movable in an upward/downward direction, and
    wherein the frame member has a groove region extending in the upward/downward direction, and the other side of the second link is disposed in the frame member, inserted into the groove region, and rotatably coupled to a fourth rotary shaft provided to be movable in a the upward/downward direction.

2. The apparatus of claim 1,
    wherein the block member is shaped such that a distance between the first rotary shaft and a region in which the pressing part is in close contact with the first spring varies depending on a rotation angle of the block member.

3. The apparatus of claim 2,
    wherein a distance between the support member and the first rotary shaft varies depending on the rotation angle of the block member.

4. The apparatus of claim 2, wherein a geometric center of the block member is spaced apart from a rotation center of the first rotary shaft.

5. The apparatus of claim 3, wherein the block member and the support member are disposed above the first spring, and the link part is disposed below the first spring.

6. The apparatus of claim 5,
    wherein an elastic modulus of the first spring is larger than an elastic modulus of the second spring.

7. The apparatus of claim 6, wherein the second spring is inserted into the first spring.

8. The apparatus of claim 6,
    wherein the first and second springs are contracted or expanded as the other side of the second link moves in the upward/downward direction.

9. The apparatus of claim 1, wherein the upper frame comprises:
    a right extension member extending in an upward/downward direction and configured to come into contact with a right region of the user's body;
    a left extension member extending in the upward/downward direction and configured to come into contact with a left region of the user's body; and
    a chest pad member coupled to the right and left extension members and configured to come into contact with the user's chest region,
    wherein the chest pad member is coupled to be movable in the upward/downward direction relative to the right extension member and to be rotatable about an axis extending in a direction in which the right extension member extends, and
    wherein the chest pad member is coupled to be movable in the upward/downward direction relative to the left extension member and to be rotatable about an axis extending in a direction in which the left extension member extends.

10. The apparatus of claim 9, wherein the upper frame further comprises bearing members respectively disposed in a region in which the right extension member and the chest pad member are coupled and a region in which the left extension member and the chest pad member are coupled, and the bearing members are configured to reduce a frictional force between the right extension member and the chest pad member and a frictional force between the left extension member and the chest pad member.

11. The apparatus of claim 9, further comprising:

a waist surrounding unit configured to surround the user's waist, wherein the frame member is fixedly coupled to the waist surrounding unit.

12. The apparatus of claim 11, wherein the force generating unit is disposed within a leftward/rightward width of the waist surrounding unit.

13. The apparatus of claim 11, wherein the lower frame comprises:

lower extension members extending along the user's lower body; and thigh pad members disposed at lower ends of the lower extension members and configured to come into close contact with the user's thighs, wherein the force generating unit is provided in plural, and the plurality of force generating units is disposed in left and right regions of the waist surrounding unit, respectively, and wherein a region in which the right extension member and the chest pad member are coupled to each other, a region in which the force generating unit disposed in the right region of the waist surrounding unit is coupled to the waist surrounding unit, and a region in which the lower extension member and the thigh pad member, which are disposed on the user's right lower body, are coupled to each other are disposed on one straight line.

14. The apparatus of claim 13, wherein a region in which the left extension member and the chest pad member are coupled to each other, a region in which the force generating unit disposed in the left region of the waist surrounding unit is coupled to the waist surrounding unit, and a region in which the lower extension member and the thigh pad member, which are disposed on the user's left lower body, are coupled to each other are disposed on one straight line.

15. The apparatus of claim 13, wherein the lower extension member comprises:

a first lower extension member connected to a lower end of the link part; and a second lower extension member having one side rotatably coupled to a lower end of the first lower extension member and the other side coupled to the thigh pad member.

16. The apparatus of claim 15, wherein the first lower extension member is coupled to be rotatable relative to the link part about an axis extending in a first direction, and the second lower extension member is coupled to be rotatable relative to the first lower extension member about an axis extending in a second direction intersecting the first direction.

\* \* \* \* \*